United States Patent
Van Baar

(10) Patent No.: US 9,346,355 B2
(45) Date of Patent: May 24, 2016

(54) MOTORCYCLE CRUISE CONTROL SYSTEM

(71) Applicant: Jacobus Eldert Maria Van Baar, Bergen (NL)

(72) Inventor: Jacobus Eldert Maria Van Baar, Bergen (NL)

(73) Assignee: Jacobus Eldert Maria Van Baar, Bergen (NL)

( * ) Notice: Subject to any disclaimer, the term of this patent is extended or adjusted under 35 U.S.C. 154(b) by 4 days.

(21) Appl. No.: 14/403,353

(22) PCT Filed: May 17, 2013

(86) PCT No.: PCT/EP2013/060265
§ 371 (c)(1),
(2) Date: Nov. 24, 2014

(87) PCT Pub. No.: WO2013/174750
PCT Pub. Date: Nov. 28, 2013

(65) Prior Publication Data
US 2015/0165904 A1  Jun. 18, 2015

(30) Foreign Application Priority Data

May 24, 2012 (EP) ..................................... 12169319

(51) Int. Cl.
*B60K 31/00* (2006.01)
*B62K 11/14* (2006.01)
(Continued)

(52) U.S. Cl.
CPC ................. *B60K 31/00* (2013.01); *B62K 11/14* (2013.01); *B62K 23/02* (2013.01); *B62K 23/06* (2013.01);
(Continued)

(58) Field of Classification Search
CPC ........ B60K 31/00; B62K 11/14; B62K 23/02; B62K 23/06; G05G 5/00; G05G 5/04; G05G 5/12; G05G 5/26; G05G 11/00; Y10T 74/20268; Y10T 74/2028; Y10T 74/206; Y10T 74/20624; Y10T 74/20822
See application file for complete search history.

(56) References Cited

U.S. PATENT DOCUMENTS 3,982,446 A    9/1976   Van Dyken
4,137,793 A *  2/1979   Sowell .................. B62K 23/04
                                                  188/77 R
(Continued)

FOREIGN PATENT DOCUMENTS

WO         2010002391        1/2010

OTHER PUBLICATIONS

International Search Report and Written Opinion for corresponding foreign application PCT/EP2013/060265, filed May 17, 2013.

*Primary Examiner* — Barry Gooden, Jr.
(74) *Attorney, Agent, or Firm* — Steven M. Koehler; Westman, Champlin & Koehler, P.A.

(57) ABSTRACT

A motorcycle cruise control system intended for cooperation with a rotary throttle grip of a motorcycle, comprises a clamping device with a stationary clamping part and a movable clamping part which is movable between a clamping position for clamping the throttle grip and maintaining it in a desired rotary position, and a release position allowing a rotation of the throttle grip, an operating mechanism for moving the movable clamping part between its clamping and release positions and a holding arrangement for holding the clamping device substantially stationary with respect to the motorcycle. The operating mechanism comprises an eccentric mechanism with a first arm and a second arm of which respective first ends are pivotably connected to the stationary clamping part and movable clamping part, respectively, and of which the second ends are pivotably connected to each other.

15 Claims, 2 Drawing Sheets

(51) Int. Cl.
*B62K 23/02* (2006.01)
*B62K 23/06* (2006.01)
*G05G 5/26* (2006.01)
*G05G 11/00* (2006.01)

(52) U.S. Cl.
CPC ............... *G05G 5/26* (2013.01); *G05G 11/00* (2013.01); *Y10T 74/2066* (2015.01); *Y10T 74/20238* (2015.01); *Y10T 74/20474* (2015.01)

(56) References Cited

U.S. PATENT DOCUMENTS

| | | | |
|---|---|---|---|
| 4,256,197 A | 3/1981 | Kiser, Jr. | |
| RE31,196 E * | 4/1983 | Sowell | B62K 23/04 188/77 R |
| 4,875,386 A * | 10/1989 | Dickerson | B62K 11/14 16/421 |
| 5,333,515 A * | 8/1994 | Schneider | B62K 23/04 403/324 |
| 6,135,227 A * | 10/2000 | Laning | B62K 11/14 123/349 |
| 6,250,173 B1 * | 6/2001 | Huston | B62K 11/14 74/489 |
| 7,520,357 B1 * | 4/2009 | Huston | B60K 31/00 180/170 |
| 2003/0047372 A1 | 3/2003 | Fechner | |
| 2006/0225937 A1 * | 10/2006 | Lemoine | B62K 23/02 180/219 |
| 2007/0151395 A1 * | 7/2007 | Barnett | B62K 11/14 74/502.2 |
| 2007/0199810 A1 * | 8/2007 | Ieda | B62K 11/14 200/61.88 |
| 2008/0184839 A1 * | 8/2008 | Negri | B62K 11/14 74/489 |
| 2010/0294077 A1 * | 11/2010 | Odendaal | B62K 11/14 74/543 |
| 2010/0313696 A1 * | 12/2010 | Vellutini | B62K 23/06 74/491 |
| 2011/0035039 A1 | 2/2011 | Simard et al. | |
| 2015/0135886 A1 * | 5/2015 | Winters | B62K 23/04 74/511 R |
| 2015/0165904 A1 * | 6/2015 | Van Baar | B62K 11/14 74/483 R |

* cited by examiner

MOTORCYCLE CRUISE CONTROL SYSTEM

CROSS-REFERENCE TO RELATED APPLICATION

This application is a Section 371 National Stage Application of International Application PCT/EP2013/060265 filed May 17, 2013 and published as WO2013/174750 A1 in English.

BACKGROUND

The discussion below is merely provided for general background information and is not intended to be used as an aid in determining the scope of the claimed subject matter.

The invention relates to a motorcycle cruise control system intended for cooperation with a rotary throttle grip of a motorcycle, comprising a clamping device with a stationary clamping part and a movable clamping part which is movable between a clamping position for clamping the throttle grip and maintaining it in a desired rotary position, and a release position allowing a rotation of the throttle grip, an operating mechanism for moving the movable clamping part between its clamping and release positions and a holding arrangement for holding the clamping device substantially stationary with respect to the motorcycle.

Such a motorcycle cruise control system is known from US 2003/0047372 A1. In this known system the operating mechanism involves an operator (motorcyclist) which has to push the movable clamping part towards the stationary clamping part, upon which a pin connected to the stationary clamping part will cooperate with a hole provided in a spring plate connected to the movable clamping part for keeping these clamping parts together. The holding arrangement of this known system comprises a rather complicated assembly of connecting arms which connect the stationary clamping part to a part of the motorcycle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the present invention a motor cycle cruise control system is provided which is characterized in that the operating mechanism comprises an eccentric mechanism with a first arm and a second arm of which respective first ends are pivotably connected to the stationary clamping part and movable clamping part, respectively, and of which the second ends are pivotably connected to each other.

Such an eccentric mechanism is very effective in maintaining the movable clamping part in its clamping position once the dead centre position of the eccentric mechanism has been passed by the first and second arms. Moreover such an eccentric mechanism, when suitably dimensioned, allows an easy transition between its extreme positions (positions in which the movable clamping part is in its clamping position and release position, respectively).

In one embodiment one of the first and second arms is provided with an operating extension intended to be manually operated by a motorcyclist. For example, the first arm which is pivotably connected to the stationary clamping part, is provided with said operating extension. Using this operating extension the motorcyclist can easily operate the eccentric mechanism for selecting the clamping position of the movable clamping part once the rotary throttle grip has assumed the desired rotary position, and for selecting the release position of the movable clamping part in which the throttle grip can rotate (be rotated) freely.

It is noted that for safety reasons it may be advisable that the design of the clamping parts is such that also in the clamping position a rotation of the throttle grip is possible when the motorcyclist applies a torque on the throttle grip above a predetermined level.

In another embodiment of the motorcycle cruise control system, the holding arrangement comprises a forked part attached to the stationary clamping part with fork arms which are spaced such that a brake lever of the motorcycle can be received between the fork arms without impeding the braking movement of said brake lever. This results in an simple yet effective design of the system which uses no complicated parts and which, therefore, may be mounted easily to the motorcycle without the need for special tools.

When such an embodiment is provided, it further may be favourable when one of the first and second arms of the eccentric mechanism in the clamping position protrudes into the space between the fork arms in such a manner that said arm will be engaged by the brake lever when latter moves to a braking position, thus moving the eccentric mechanism towards its position in which the movable clamping part of the clamping device is in its release position.

Such an embodiment ensures that the movable clamping part will automatically move towards its release position when the braking lever is operated. This enhances the safety of the system.

In a special embodiment of the motorcycle cruise control system the first arm which is pivotably connected to the stationary clamping part, is provided with an operating extension intended to be manually engaged by a motorcyclist, wherein said first arm in the clamping position of the movable clamping part protrudes into said space between the fork arms. Thus the operating lever allows to position the (movable clamping part of the) system in its release and clamping positions, whereas the braking lever, when operated, may engage the protruding part of the first arm for moving the (movable clamping part of the) system automatically towards its release position.

In other embodiments at least one of the fork arms may be settable for setting the spacing between these fork arms, and at least one of the stationary and movable clamping parts may be settable for setting the spacing between these parts in the clamping position. This allows the system to be adjusted taking into account specific dimensions of the braking lever and rotary throttle grip, respectively, of the motorcycle for which the system is meant.

It is conceivable, for example, that the stationary clamping part is settable.

In a practical embodiment, the motorcycle cruise control system comprises a frame defining two fork arms which are spaced such that a brake lever of the motorcycle can be received between the fork arms without impeding the braking movement of said brake lever, which frame pivotably carries the movable clamping part and settably carries the stationary clamping part, and wherein the first end of the first arm and the movable clamping part are pivotably connected to said frame.

Such a frame allows to define the relative position of the constitutive parts of the system in an easy manner.

It is conceivable then, that the stationary clamping part comprises at least one opening through which a releasable locking member, such as a bolt, screw or alike, extends which also extends through a corresponding hole in the frame, and wherein at least one of the opening and hole has an elongate shape. This allows an easy adjustment of the stationary clamping part for coping with a specific diameter of the throttle grip, by loosening the locking member, displacing the stationary clamping part (while sliding the locking member along the elongate hole and/or opening) and again tightening the locking member.

For an increased stability of the stationary clamping part, it may comprise two openings with corresponding locking members extending through two holes in the frame.

In yet another embodiment of the motorcycle cruise control system, said frame defines a fully surrounded opening intended for receiving the rotary throttle grip of the motorcycle, wherein the stationary and movable clamping parts protrude into said opening. Such a fully surrounded opening makes the frame very stiff.

Further it is possible that one fork arm comprises a settable fork arm part which comprises at least one opening through which a releasable locking member, such as a bolt, screw or alike, extends which also extends through a corresponding hole in the frame, and wherein at least one of the opening and hole has an elongate shape. This allows an easy adjustment of the settable fork arm part for coping with a specific dimension of the braking lever, by loosening the locking member, displacing the settable fork arm part (while sliding the locking member along the elongate hole and/or opening) and again tightening the locking member.

Again, it is favourable for an increased stability of said settable fork part, that the settable fork part comprises two openings with corresponding locking members extending through two holes in the frame.

BRIEF DESCRIPTION OF THE DRAWINGS

Hereinafter aspects of the invention will be elucidated while referring to the drawing, in which.

DETAILED DESCRIPTION OF THE ILLUSTRATIVE EMBODIMENTS

Figure 1:
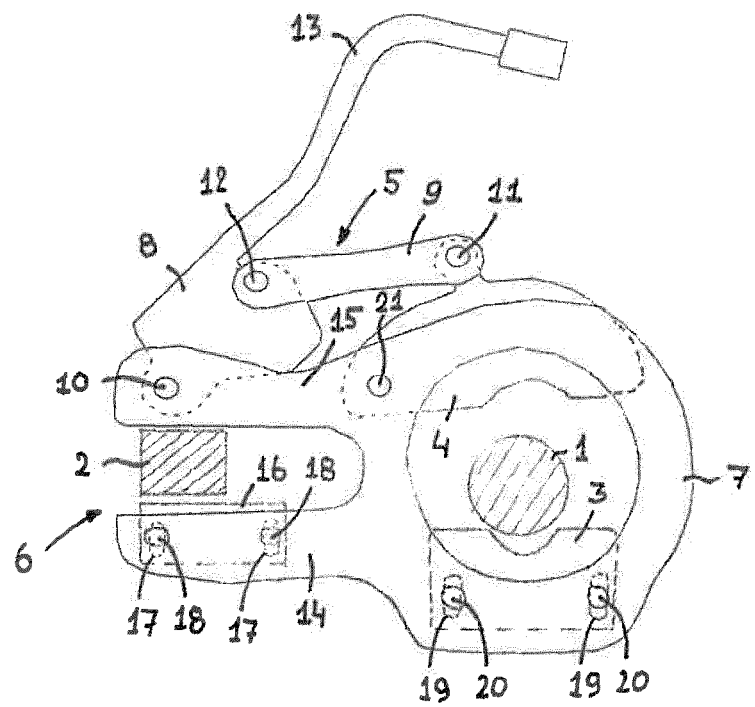
FIG. 1 shows a first embodiment of the system in an inoperative, non-clamping position.
Figure 2:
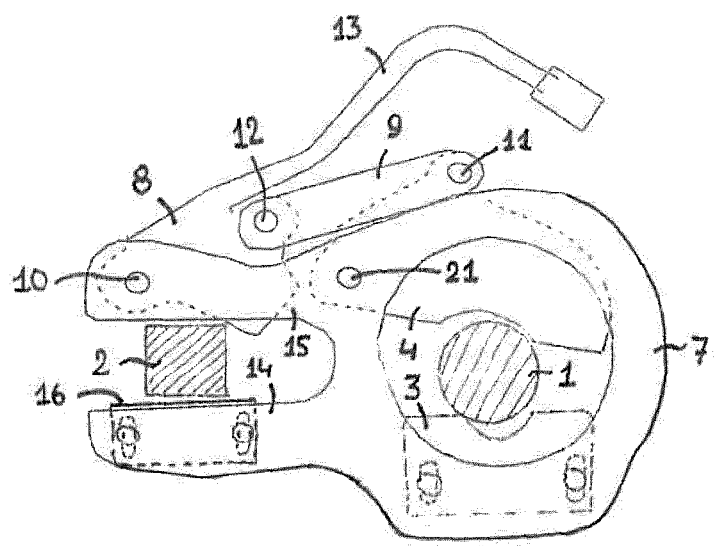
FIG. 2 shows said first embodiment of the system in an operative, clamping position.

The motorcycle cruise control system illustrated in the figures is intended for cooperation with a rotary throttle grip 1 (shown in cross section in FIGS. 1 and 2) of a motorcycle, of which in the FIGS. 1 and 2 also the braking lever 2 (also shown in cross section) has been represented.

Firstly referring to the first embodiment illustrated in the FIGS. 1 and 2, the system basically comprises a clamping device with a stationary clamping part 3 and a movable clamping part 4 which is movable between a clamping position (FIG. 2) for clamping the throttle grip 1 and maintaining it in a desired rotary position, and a release position (FIG. 1) allowing a rotation of the throttle grip, an operating mechanism 5 (to be elucidated below) for moving the movable clamping part 4 between its clamping and release positions and a holding arrangement 6 for holding the clamping device substantially stationary with respect to the motorcycle.

The system comprises a frame 7 to which all its constitutive parts are attached in a manner described below. The frame 7 may comprise two similar frame plates positioned at some distance for receiving there between the remaining constitutive parts of the system.

The operating mechanism 5 comprises an eccentric mechanism with a first arm 8 and a second arm 9 of which respective first ends are pivotably connected at pivots 10 and 11 to the stationary clamping part 3 (via the frame 7 which, as will appear later, also carries the stationary clamping part) and movable clamping part 4, respectively. The second ends of the arms 8 and 9 are pivotably connected to each other at pivot 12.

The first arm 8 is provided with an operating extension 13 which may be operated manually by a motorcyclist, as will appear later.

The movable clamping part 4 is pivotably connected to the frame at pivot 21.

The holding arrangement 6 comprises a forked part with two fork arms 14 and 15 which are part of the frame 7 and thus are attached to the stationary clamping part 3. These fork arms 14,15 are spaced such that the brake lever 2 of the motorcycle can be received between the fork arms without impeding the braking movement of said brake lever.

Fork arm 14 comprises a settable fork arm part 16 which comprises two elongate openings 17 through which releasable locking members 18, such as bolts, screws or alike, extend which also extend through corresponding holes in the frame 7. As a result the fork part 16 can be set for varying the distance (spacing) between the fork arms 14 and 15 for coping with brake levers 2 with different dimensions.

The stationary clamping part 3 likewise comprises two elongate openings 19 through which two releasable locking members 20, such as a bolts, screws or alike, extend which also extend through corresponding holes in the frame 7. As a result the stationary clamping part 3 can be set relative to the frame 7 for varying the distance (spacing) between the clamping parts 3,4 in the clamping position of the movable clamping part 4 for coping with throttle grips with different diameters.

The frame 7 further defines a fully surrounded opening 21 intended for receiving the rotary throttle grip 1 of the motorcycle, wherein the stationary and movable clamping parts 3,4 protrude into said opening.

As shown clearly in FIG. 2, the first arm 8 of the eccentric mechanism in the clamping position protrudes into the space between the fork arms 14,15 in such a manner that said first arm 8 will be engaged by the brake lever 2 when latter moves to a braking position, thus moving the eccentric mechanism towards its position (according to FIG. 1) in which the movable clamping part 4 of the clamping device is in its release position.

The operation of the system is as follows. Starting in the release position according to FIG. 1 (in which the movable clamping part 4 is at such a distance from the stationary clamping part 3 that the throttle grip 1 can rotate freely) the motorcyclist rotates the throttle grip 1 to a desired speed position and then moves (rotation around pivot 10) operating extension 13 downward (towards the throttle grip), as a result of which the eccentric mechanism moves beyond its dead centre position (in which pivots 10, 11 and 12 are aligned) to the clamping position of the movable clamping part 4 (in which the movable clamping part 4 has been rotated around pivot 21 and is at such a smaller distance from the stationary clamping part 3 that the throttle grip 1 cannot rotate freely) as illustrated in FIG. 2.

For again moving the system to the release position, there are two options. The first option is to manually lift the operating extension 13 (rotation around pivot 10 away from the throttle grip) and thus lifting the movable clamping part 4 by a rotation around pivot 10. The second option includes moving the brake lever (in FIG. 2 to the right), as a result of which it will engage the part of the first arm 8 which protrudes into the space between the fork arm 14 and 15, thus rotating the first arm around pivot 10 beyond the dead centre position of the eccentric position (towards the position according to FIG. 1) and again lifting the movable clamping part 4.

Figure 3:
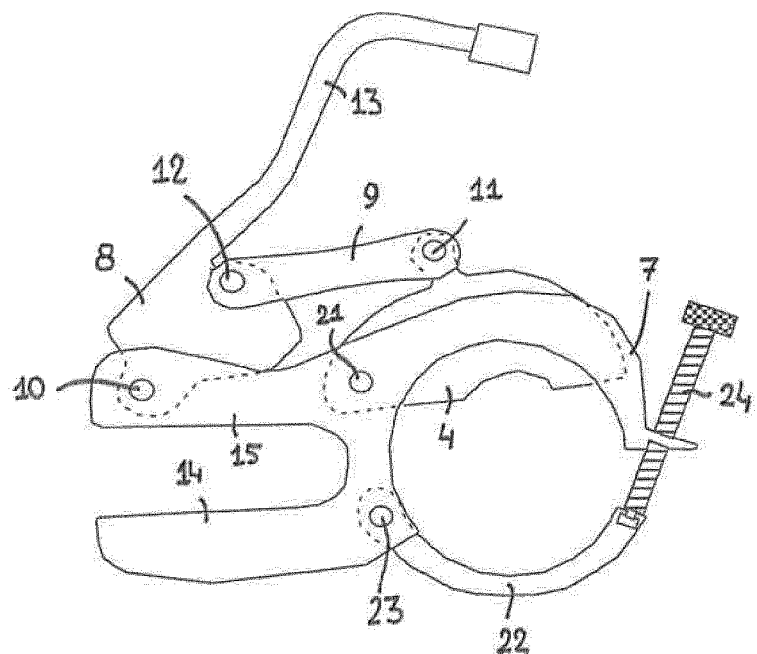
FIG. 3 shows a second embodiment of the system in an inoperative, non-clamping position.
Figure 4:
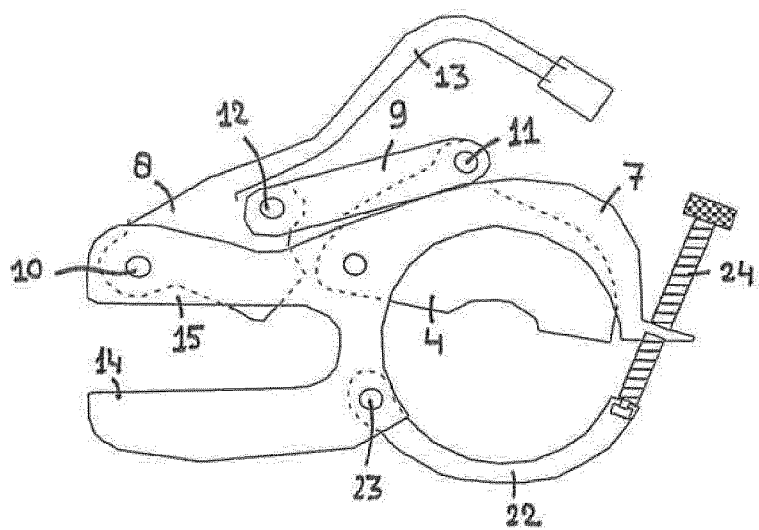
FIG. 4 shows said second embodiment of the system in an operative, clamping position.

Referring to FIGS. 3 and 4, a second embodiment is illustrated which has a number of parts similar to the first embodiment (indicated by the same reference numbers). There are, however, a few differences: firstly the settable fork arm part 16 has been omitted. Secondly, the frame 7 now does not extend continuously around the throttle grip receiving opening, but is provided with a pivotable frame part 22 with pivot 23 which by means of a set screw 24 may be set for coping with throttle grips with different diameters. As a result, the stationary, settable clamping part now is defined by said frame part 22 (whereas frame part 3 of the first embodiment has been omitted).

The invention is not limited to the embodiments described before which may be varied widely within the scope of the invention as defined by the appending claims.

The invention claimed is:

1. A motorcycle cruise control system intended for cooperation with a rotary throttle grip of a motorcycle, comprising a clamping device with a stationary clamping part and a movable clamping part which is movable between a clamping position configured to clamp the throttle grip and maintaining the throttle grip in a desired rotary position, and a release position allowing a rotation of the throttle grip, an operating mechanism configured to move the movable clamping part between its clamping and release positions and a holding arrangement configured to hold the clamping device substantially stationary with respect to the motorcycle, wherein the operating mechanism comprises an eccentric mechanism with a first arm and a second arm of which respective first ends are pivotably connected to the stationary clamping part and the movable clamping part, respectively, and of which the second ends are pivotably connected to each other.

2. The motorcycle cruise control system according to claim 1, wherein one of the first and second arms is provided with an operating extension configured to be manually operated by a motorcyclist.

3. The motorcycle cruise control system according to claim 2, wherein the first arm which is pivotably connected to the stationary clamping part, is provided with said operating extension.

4. The motorcycle cruise control system according to claim 1, wherein the holding arrangement comprises a forked part attached to the stationary clamping part with fork arms which are spaced such that a brake lever of the motorcycle can be received between the fork arms without impeding the braking movement of said brake lever.

5. The motorcycle cruise control system according to claim 4, wherein at least one of the fork arms is settable to set the spacing between the fork arms.

6. The motorcycle cruise control system according to claim 4, wherein one of the first and second arms of the eccentric mechanism in the clamping position protrudes into the space between the fork arms in such a manner that said arm will be engaged by the brake lever when latter moves to a braking position, thus moving the eccentric mechanism towards its position in which the movable clamping part of the clamping device is in its release position.

7. The motorcycle cruise control system according to claim 6, wherein the first arm which is pivotably connected to the stationary clamping part, is provided with an operating extension configured to be manually engaged by a motorcyclist and wherein said first arm in the clamping position of the movable clamping part protrudes into said space between the fork arms.

8. The motorcycle cruise control system according to claim 1, wherein at least one of the stationary and movable clamping parts is settable to set the spacing between these parts in the clamping position.

9. The motorcycle cruise control system according to claim 8, wherein the stationary clamping part is settable.

10. The motorcycle cruise control system according to claim 1, comprising a frame defining two fork arms which are spaced such that a brake lever of the motorcycle can be received between the fork arms without impeding the braking movement of said brake lever, which frame pivotably carries the movable clamping part and settably carries the stationary clamping part, and wherein the first end of the first arm and the movable clamping part are pivotably connected to said frame.

11. The motorcycle cruise control system according to claim 10, wherein the frame defines a fully surrounded opening configured to receive the rotary throttle grip of the motorcycle, wherein the stationary and movable clamping parts protrude into said opening.

12. The motorcycle cruise control system according to claim 10, wherein the stationary clamping part comprises at least one opening through which a releasable locking member extends which also extends through a corresponding hole in the frame, and wherein at least one of the opening and hole has an elongate shape.

13. The motorcycle cruise control system according to claim 12, wherein the stationary clamping part comprises two openings with corresponding locking members extending through two holes in the frame.

14. The motorcycle cruise control system according to claim 10, wherein one fork arm comprises a settable fork arm part which comprises at least one opening through which a releasable locking member extends which also extends through a corresponding hole in the frame, and wherein at least one of the opening and hole has an elongate shape.

15. The motorcycle cruise control system according to claim 14, wherein the settable fork part comprises two openings with corresponding locking members extending through two holes in the frame.

* * * * *